(12) United States Patent
Linde et al.

(10) Patent No.: US 10,286,997 B2
(45) Date of Patent: May 14, 2019

(54) STRUCTURAL COMPONENT WITH AN ELECTRICAL TRANSMISSION DEVICE, METHOD FOR PROVIDING A STRUCTURAL COMPONENT WITH AN ELECTRICAL TRANSMISSION DEVICE, ELECTRICAL WIRING SYSTEM AND AIRCRAFT COMPONENT

(71) Applicant: Airbus Operations GmbH, Hamburg (DE)

(72) Inventors: Peter Linde, Hamburg (DE); Leif Asp, Moelndal (SE); Dan Zenkert, Lidingoe (SE)

(73) Assignee: Airbus Operations GmbH (DE)

( * ) Notice: Subject to any disclaimer, the term of this patent is extended or adjusted under 35 U.S.C. 154(b) by 25 days.

(21) Appl. No.: 15/644,000

(22) Filed: Jul. 7, 2017

(65) Prior Publication Data
US 2018/0015995 A1 Jan. 18, 2018

(30) Foreign Application Priority Data
Jul. 18, 2016 (EP) .................................... 16180004

(51) Int. Cl.
*H01B 17/00* (2006.01)
*B64C 1/40* (2006.01)
(Continued)

(52) U.S. Cl.
CPC ................ *B64C 1/406* (2013.01); *B32B 5/02* (2013.01); *B32B 5/26* (2013.01); *B32B 7/02* (2013.01);
(Continued)

(58) Field of Classification Search
CPC .. B64C 1/406; B32B 5/02; B32B 5/26; B32B 7/02; B32B 2307/206; B32B 2313/04;
(Continued)

(56) References Cited

U.S. PATENT DOCUMENTS 5,059,483 A * 10/1991 Lunk ...................... H01B 3/443
174/110 F
5,220,130 A * 6/1993 Walters .............. H01B 11/1839
174/113 R
(Continued)

FOREIGN PATENT DOCUMENTS

EP    2 053 078 A1    4/2009
GB    2 473 226 A     3/2011
(Continued)

OTHER PUBLICATIONS

EP 16180004.0 Search Report dated Jan. 4, 2017.

*Primary Examiner* — Angel R Estrada
(74) *Attorney, Agent, or Firm* — Lerner, David, Littenberg, Krumholz & Mentlik, LLP

(57) ABSTRACT

A structural component includes a composite laminate built up of a plurality of layers of carbon fibers, wherein the layers of carbon fibers are oriented in different directions, wherein the carbon fibers are surrounded by a conductive polymer resin, wherein the carbon fibers of at least one of the layers comprise an electrically insulating coating, and wherein at least one of the coated carbon fibers extend through its respective layer to form an electrical connection between ends of the layer spaced apart from one another.

17 Claims, 3 Drawing Sheets

(51) Int. Cl.
  *B32B 5/02*  (2006.01)
  *B32B 5/26*  (2006.01)
  *B32B 7/02*  (2019.01)
  *H02G 3/30*  (2006.01)

(52) U.S. Cl.
  CPC .......... *H02G 3/30* (2013.01); *B32B 2307/206* (2013.01); *B32B 2313/04* (2013.01); *B32B 2457/04* (2013.01); *B32B 2605/18* (2013.01); *Y02T 50/46* (2013.01)

(58) Field of Classification Search
  CPC ........ B32B 2457/04; H02G 3/30; H02G 3/34; H02G 3/36
  USPC .............................. 174/138 G, 137 R, 138 R
  See application file for complete search history.

(56) References Cited

U.S. PATENT DOCUMENTS 7,612,290 B1 * 11/2009 Le ........................ H01B 7/0861
                                                       174/117 F
8,173,902 B2 * 5/2012 Smallhorn ............... H02G 3/32
                                                       174/72 A

FOREIGN PATENT DOCUMENTS

GB           2 500 699 A    10/2013
WO      2010/004262 A2      1/2010

\* cited by examiner

STRUCTURAL COMPONENT WITH AN ELECTRICAL TRANSMISSION DEVICE, METHOD FOR PROVIDING A STRUCTURAL COMPONENT WITH AN ELECTRICAL TRANSMISSION DEVICE, ELECTRICAL WIRING SYSTEM AND AIRCRAFT COMPONENT

FIELD OF THE INVENTION

The present invention pertains to a structural component with an electrical transmission device, a method for providing a structural component with an electrical transmission device, an electrical wiring system, and an aircraft component.

Although applicable for any kind of vehicle, the present invention and the corresponding underlying problems will be explained in further detail in conjunction with an aircraft component.

BACKGROUND OF THE INVENTION

Present electrical wiring systems of aircrafts usually comprise a plurality of electrical wires in the form of single cables which are combined in a duct being coupled to a fuselage structure of the aircraft. These wiring systems are used for transmission of electrical power or data transmission. Accordingly, the aircraft data-transmission system is built up essentially of electrical wires that are placed separated from the cabin panels. These wires run in cable bundles, often jointly with power cables. Typically, each wire is solid and round and is supplied with insulation. Several such wires run together in cable bundles. Again, these bundles are fixed into their locations by means of brackets. The brackets are attached to cabin panels.

BRIEF SUMMARY OF THE INVENTION

It is an idea of the invention to provide a structural component, in particular structural component for an aircraft, with an electrical transmission device and an electrical wiring system which comprise a light weight structure and which can be installed in an easy and flexible manner, respectively.

According to a first aspect of the invention, a structural component comprises a composite laminate built up of a plurality of layers of carbon fibres, wherein the layers of carbon fibres are oriented in different directions and wherein the carbon fibres are surrounded by a conductive polymer resin, wherein the carbon fibres of at least one of the layers comprise an electrically insulating coating, and wherein at least one of the coated carbon fibres extend through its respective layer to form an electrical connection between ends of the layer spaced apart from one another.

Providing the structural component with coated carbon fibres provides a structural device with a functionality as an electrical transmitting means, in particular an electrical data transmission cable, which itself constitutes an integral part of the composite laminate while the structural component continues to maintain its original function, which is to carry a load. In other words, this constitutes some sort of a multifunctional cable.

According to one embodiment of the structural component stripped end portions of the at least one coated fibre protrude from its respective end of the layer easing the connection with at least one transmission means or its subset. In particular, the transmission means is formed by at least one electrical circuit, which is connectable to at least one power source and/or at least one signal processing device.

The use of a plurality of coated carbon fibres provided for electrical transmission provides redundancy.

Further, these coated carbon fibres can have very small diameters, which is in the order of some microns, for example between 3 and 12 micrometers, in particular between 5 and 10 micrometers, because the cross section of an ordinary metallic signal cable is reduced drastically. In addition, a rubberized insulation is not used here, nor are the brackets to fasten cables.

A second aspect of the invention relates to a method for providing a structural component, in particular a structural component according the preceding explanations comprising at least the providing of a composite laminate of carbon fibre layers with at least one of which layers containing carbon fibres coated with an electrically insulating coating, the manufacture of the structural component, the stripping of the insulation at opposite ends of at least one coated carbon fibre, connecting the stripped ends of the at least one carbon fibre with at least one of signal processing means and a power source, transmitting signals or power.

The manufacture of the structural component is eased by a variant of the method, wherein the at least one coated carbon fibre is provided as a carbon fibre yarn or tow coated with an electrically insulating polymer electrolyte.

A variant of the method provides the use of digital data transmission, which may pass through several cables, whereby the data signals are coded as to which is the sender and for which receiver they are determined. In this manner an electrical redundancy can easily be achieved, if a damage occurs at one location. This redundancy is not necessarily given for today's common single metallic cables.

A further aspect of the invention relates to an electrical wiring system, extending along a structural component of an aircraft, wherein the electrical wires are formed by coated carbon fibres extending through at least one layer of a composite laminate of the structural component thereby providing a possibility to transport electrical signals along the structural component with little installation effort.

A fourth aspect of the invention concerns an aircraft, comprising a structural component with the composite laminate comprising a coated carbon fibre layer according to one of the embodiments described above. In particular, the structural component described above comprises a low weight per length due to the integration of the electrical wiring in the component. Hence, the structural component may be integrated in an aircraft, i.e. as a data transmission line or an electrical supply line for electrical functional components arranged within the interior of a fuselage structure of an aircraft, i.e. lighting devices, pumps, or such like.

Generally, according to the present invention the structural component and its operating method provide the possibilities, that neither a separate manufacturing of electrical circuitry nor a separate installation of cable bundles is necessary, brackets to fasten cables can as well be avoided as any bonded power/data transmitting tapes or any ink-jet printed circuits. Additionally, no foreign objects are inserted into the sensitive laminate, such as copper cables, fibre optical cables etc., that may deteriorate the structural performance and can be cause for delaminations and cracks. Space requirements as well as weight are reduced, there exists a lower risk that cables or jet-ink circuits are torn apart or damaged during work and maintenance. Further there is no risk of vibrating cables, and the efforts for inspection and maintenance are reduced significantly. If using digital data transmission with a plurality of fibres, a redundancy is achieved, not available for single metallic cables, which in particular constitutes an safety-improvement.

BRIEF DESCRIPTION OF THE DRAWINGS

The invention will be explained in greater detail with reference to exemplary embodiments depicted in the drawings as appended.

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

Figure 1:
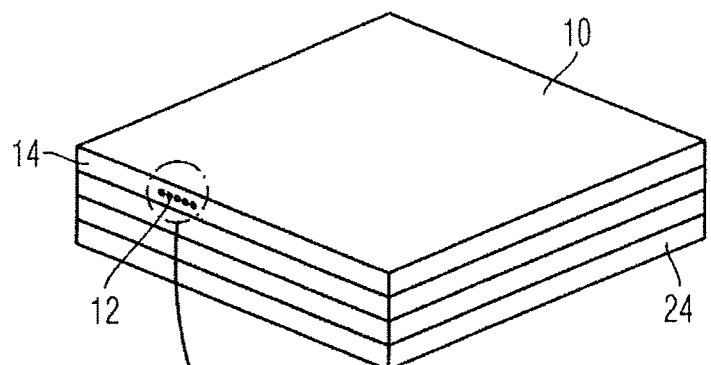
FIG. 1 schematically illustrates a well known structural component represented by a composite laminate panel built up from layers of carbon fibres.

In the figures, like reference numerals denote like or functionally like components, unless indicated otherwise. Any directional terminology like "top", "bottom", "left", "right", "above", "below", "horizontal", "vertical", "back", "front", and similar terms are merely used for explanatory purposes and are not intended to delimit the embodiments to the specific arrangements as shown in the drawings.

DETAILED DESCRIPTION

Although specific embodiments have been illustrated and described herein, it will be appreciated by those of ordinary skill in the art that a variety of alternate and/or equivalent implementations may be substituted for the specific embodiments shown and described without departing from the scope of the present invention. Generally, this application is intended to cover any adaptations or variations of the specific embodiments discussed herein.

Figure 2:
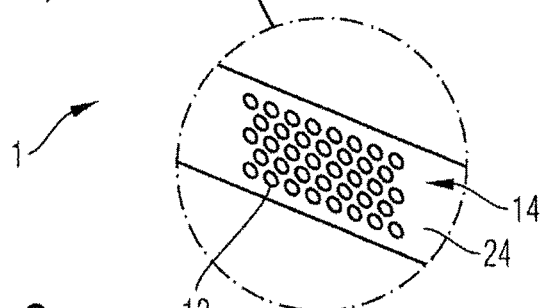
FIG. 2 shows the embodiment of FIG. 1 in greater detail as to observe single carbon fibres in a sectional view of a carbon fibre layer.

FIGS. 1 and 2 show a structural component 1 as known in the art. FIG. 1 in particular shows a structural component 1 formed by a composite laminate 10 as seen in a sectional view built up of several layers of carbon fibres 12, also referred to as "plies". The plies are oriented in different directions. The fibres 12 are surrounded by polymer resin 14. This composite laminate 10 as part of a structural component 1 has structural capabilities and is able to carry a load not shown here.

Figure 3:
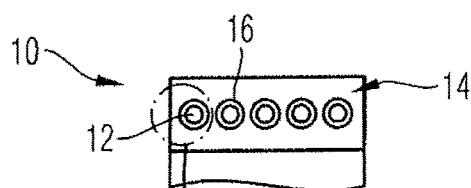
FIG. 3 schematically illustrates an exemplary embodiment of a structural component according to the invention with a single layer of adjacent carbon fibres provided with a coating in a sectional view.

FIG. 3 shows a structural component 1 according to an embodiment of the invention. Here, fibre coatings 16 surrounding the carbon fibres 12 provide an electrical insulation. Thus, for example, these coatings 16 can take over the insulating function of an insulation layer of the composite laminate 10 not shown here. This can result in a significant reduction of laminate thickness and by that provide a reduced weight and thinner thickness.

Figure 4:
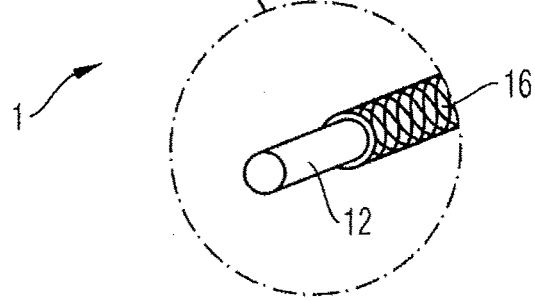
FIG. 4 schematically illustrates the embodiment of FIG. 3 with one coated carbon fibre with a stripped end portion.

FIG. 4 shows the embodiment of FIG. 3 in greater detail with one coated carbon fibre 12 with a stripped end portion 22. Inside one can see graphitic carbon, with good electrical conduction properties, and on the outside is the electrically insulating coating 16. Thus, we now have a structural device with functionality as an electrical transmitting cable, e.g. a data transmitting cable, the cable being considerably smaller in diameter, in the order of some micrometer. Accordingly, figuratively spoken, the coated fibres 12 built an electrically charged cable extending through the structural component 1, which itself is additionally provided with electrically conducting capabilities and therefore is able to transport power or data in form of signals along its extension.

Figure 5:
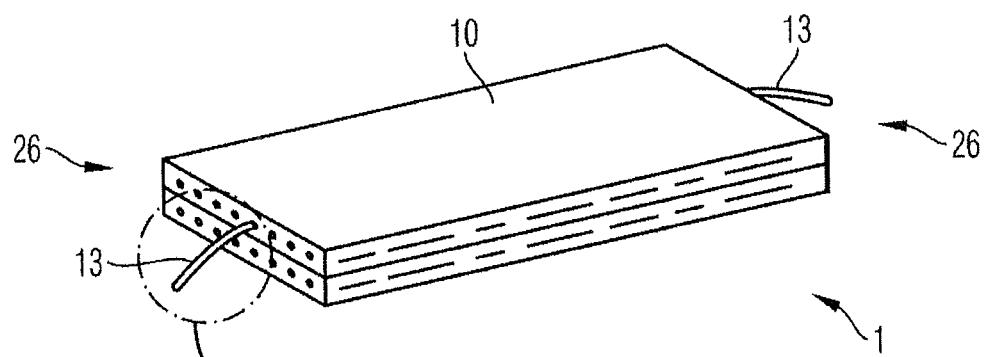
FIG. 5 schematically illustrates a further exemplary embodiment of a structural component according to the invention with a composite laminate panel with coated fibres with one coated fibre protruding at opposite ends of a single layer.

As best can be taken from FIG. 5, is the manner how to connect the "cable" formed by the coated carbon fibre 13 to an external source. FIG. 5 schematically illustrates an exemplary embodiment of the structural component 1 with a composite laminate panel 10 with coated fibres 12 with one coated fibre 13 protruding at opposite short ends 26 of a single layer 24 of the composite laminate panel 10.

Figure 6:
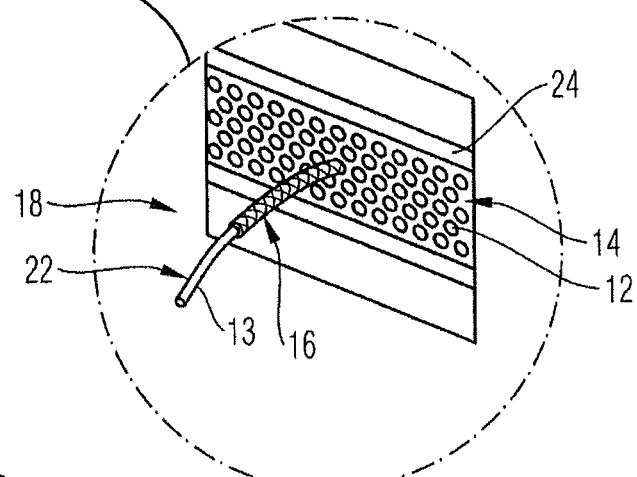
FIG. 6 shows the embodiment of FIG. 6 in greater detail with one of the protruding ends of the fibre with a stripped end portion.

FIG. 6 shows the respective layer in greater detail. One can extract form FIG. 6 a single carbon fibre 18 and its coating 16 protruding from the flat short end 26 of its layer 24. At its end portion 18, the coating 16 of the carbon fibre 13 was stripped in order to establish a conductive connection with a signal or power source not shown in FIG. 6.

Figure 7:
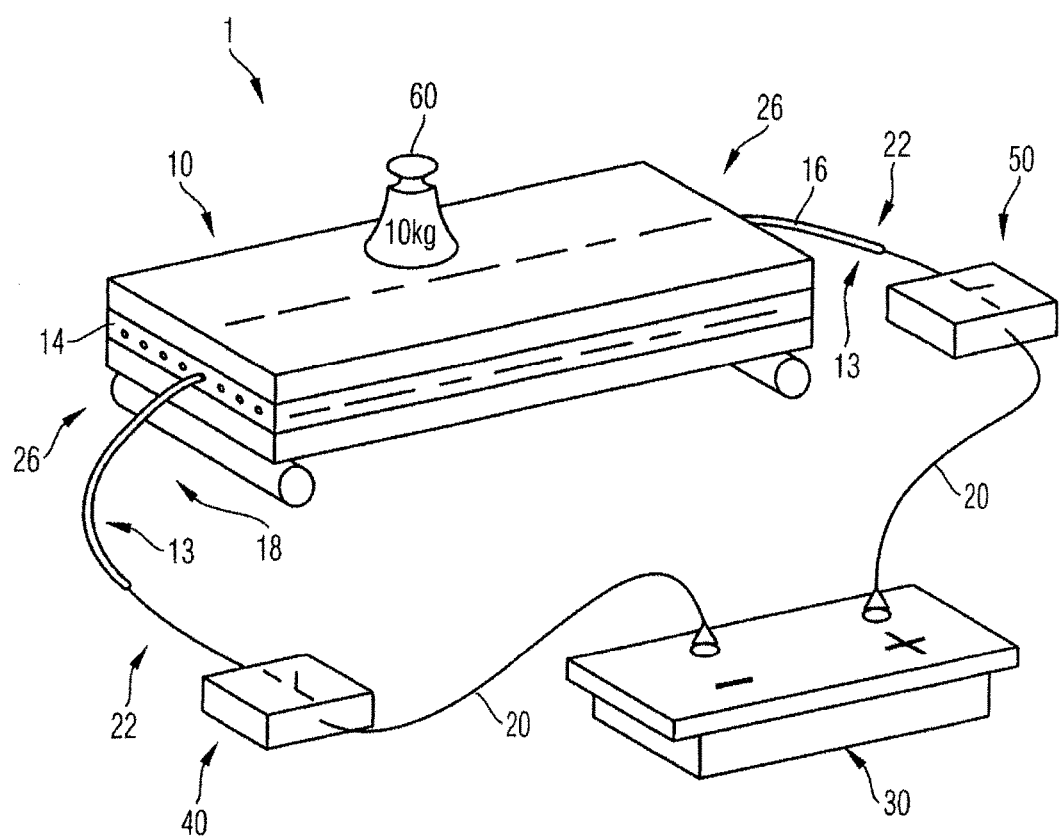
FIG. 7 schematically illustrates an exemplary embodiment of a structural component according to the invention with the composite laminate with coated fibre as part of signal transmission of data.

In FIG. 7 an exemplary embodiment of a structural component 1 is schematically illustrated. One can see the same composite laminate as in FIG. 6, now with the end portions 18 of the coated carbon fibres 12 connected to an electric circuit 20 and a power source 30. At the left, one can see a signal sending device 40. With this signal sending device 40, signals can be started and stopped. In order to electrically drive this device, it must in itself have a power source 30. On the right hand side of the composite laminate 10, a signal receiving device 50 is seen, that registers when a signal is being sent. Again, this device needs a power source 30.

One recognises from FIG. 7, that one of the many carbon fibres 12 in the composite laminate 10 carries out an electrical transmission function while all the other fibres 12 carry out its original function, which is to carry a load, symbolically depicted as a weight 60; accordingly the composite laminate 10 functions structurally and is loaded by a weight, placed in a central position in the middle of the laminate 10.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification.

The embodiments were chosen and described in order to best explain the principles of the invention and its practical applications, to thereby enable others skilled in the art to best utilize the invention and various embodiments with various modifications as are suited to the particular use contemplated. In the appended claims and throughout the specification, the terms "including" and "in which" are used as the plain-English equivalents of the respective terms "comprising" and "wherein," respectively. Furthermore, "a" or "one" does not exclude a plurality in the present case.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A structural component comprising:
   a composite laminate built up of a plurality of layers of carbon fibres, wherein the layers of carbon fibres are oriented in different directions and wherein the carbon fibres are surrounded by a conductive polymer resin,
   wherein the carbon fibres of at least one of the layers comprise an electrically insulating coating,
   wherein at least one of the coated carbon fibres extend through its respective layer to form an electrical connection between ends of the layer spaced apart from one another, and
   wherein stripped end portions of the at least one coated fibre protrude from its respective end of the layer and are connectable or connected with at least one transmission means or a subset of the at least one transmission means.

2. The structural component of claim 1, wherein the transmission means is formed by at least one electrical circuit, connectable to at least one power source.

3. The structural component of claim 1, wherein the transmission means is formed by at least one electrical circuit, connectable to at least one signal processing device.

4. The structural component of claim 1, wherein a plurality of carbon fibres are provided for electrical transmission.

5. The structural component of claim 4, wherein the plurality of carbon fibres are provided for electrical signal transmission along the component.

6. An electrical wiring system extending along a structural component according to claim 1, of an aircraft, wherein the electrical wires are formed by coated carbon fibres extending through at least one layer of a composite laminate of the structural component.

7. A structural component comprising:
   a composite laminate built up of a plurality of layers of carbon fibres, wherein the layers of carbon fibres are oriented in different directions and wherein the carbon fibres are surrounded by a conductive polymer resin,
   wherein the carbon fibres of at least one of the layers comprise an electrically insulating coating,
   wherein at least one of the coated carbon fibres extend through its respective layer to form an electrical connection between ends of the layer spaced apart from one another, and
   wherein the at least one coated carbon fibre has a small diameter in the order of some microns.

8. The structural component of claim 7, wherein the at least one coated carbon fibre has a diameter between 3 and 12 micrometers.

9. The structural component of claim 8, wherein the at least one coated carbon fibre has a diameter between 5 and 10 micrometers.

10. An electrical wiring system extending along a structural component according to claim 7, of an aircraft, wherein the electrical wires are formed by coated carbon fibres extending through at least one layer of a composite laminate of the structural component.

11. A method for providing a structural component, comprising:
    providing a composite laminate of carbon fibre layers with at least one of which layers containing at least one carbon fibre coated with an electrically insulating coating-;
    manufacturing the structural component;
    stripping insulation at the opposite ends of at least one coated carbon fibre; and
    connecting stripped ends of the at least one carbon fibre with at least one of signal processing means and power source.

12. The method of claim 11, wherein the at least one coated carbon fibre is provided as a carbon fibre yarn.

13. The method of claim 11, wherein the at least one coated carbon fibre is tow coated with an electrically insulating polymer electrolyte.

14. The method of claim 11, wherein a plurality of coated carbon fibres is used.

15. The method of claim 11, further comprising transmitting or processing electrical signals, wherein the electrical signals processed are coded digital data signals.

16. An aircraft comprising a structural component, the structural component comprising:
    a composite laminate built up of a plurality of layers of carbon fibres, wherein the layers of carbon fibres are oriented in different directions and wherein the carbon fibres are surrounded by a conductive polymer resin;
    wherein the carbon fibres of at least one of the layers comprise an electrically insulating coating, and
    wherein at least one of the coated carbon fibres extend through its respective layer to form an electrical connection between ends of the layer spaced apart from one another.

17. An electrical wiring system extending along a structural component according to claim 16 of an aircraft, wherein the electrical wires are formed by coated carbon fibres extending through at least one layer of a composite laminate of the structural component.

* * * * *